United States Patent
Braun et al.

(10) Patent No.: US 8,969,750 B2
(45) Date of Patent: Mar. 3, 2015

(54) METHOD AND APPARATUS FOR CONTROLLING ELECTRODE ARMS OF A WELDING DEVICE

(75) Inventors: Florian Braun, Ostfildein (DE); Thomas Laubacher, Waiblingen (DE); Helmut Schneider-König, Remshalden (DE); Frank Schnur, Bönnigheim (DE)

(73) Assignee: Norgren GmbH, Fellbach (DE)

( * ) Notice: Subject to any disclaimer, the term of this patent is extended or adjusted under 35 U.S.C. 154(b) by 1980 days.

(21) Appl. No.: 11/793,929

(22) PCT Filed: Nov. 30, 2005

(86) PCT No.: PCT/DE2005/002161
§ 371 (c)(1),
(2), (4) Date: Jun. 22, 2007

(87) PCT Pub. No.: WO2006/066528
PCT Pub. Date: Jun. 29, 2006

(65) Prior Publication Data
US 2007/0295697 A1   Dec. 27, 2007

(30) Foreign Application Priority Data
Dec. 23, 2004 (DE) .......................... 10 2004 063 463

(51) Int. Cl.
*B23K 9/28* (2006.01)
*B23K 11/31* (2006.01)

(52) U.S. Cl.
CPC ............. *B23K 11/317* (2013.01); *B23K 11/314* (2013.01)
USPC .......................................... 219/90; 219/86.33

(58) Field of Classification Search
CPC ....... B23K 11/10; B23K 11/11; B23K 11/115

USPC .......... 219/86.41, 89, 90, 91.2, 86.51; 92/131, 92/420
See application file for complete search history.

(56) References Cited

U.S. PATENT DOCUMENTS 4,712,470 A * 12/1987 Schmitz ........................ 91/433
4,810,849 A *  3/1989 Heideman ..................... 219/89
(Continued)

FOREIGN PATENT DOCUMENTS

| DE | 36 00 364 C1 | 7/1987 |
| DE | 199 55 017 A1 | 5/2001 |

(Continued)

OTHER PUBLICATIONS

Machine Translation of DE 201 07 328, Festo, Oct. 4, 2001.*
(Continued)

*Primary Examiner* — Brian Jennison
(74) *Attorney, Agent, or Firm* — The Ollila Law Group LLC

(57) ABSTRACT

The invention relates to a compensation cylinder unit that acts as a drive for the electrode arms of a welding device. The unit comprises a cylinder and at least two pressure chambers, which are sub-divided by a piston assembly and which can be alternately supplied with a pressurized medium by means of a valve assembly for controlling the drive displacement. According to the invention, the valve assembly comprises a proportional valve which can be controlled by a control unit, first in accordance with harmonized path signals that represent the position of the piston assembly and then by pressure signals that respectively represent the pressure in the pressure chambers, in such a way that the difference between the pressures that prevail in the pressure chambers in a predeterminable position of the piston assembly assumes a constant value that represents the weight compensation force of at least one electrode arm.

14 Claims, 3 Drawing Sheets

(56) References Cited

U.S. PATENT DOCUMENTS

| | | | |
|---|---|---|---|
| 5,906,755 A | 5/1999 | Arasuna et al. | |
| 6,082,406 A * | 7/2000 | Williamson et al. | 137/627.5 |
| 6,294,750 B1 * | 9/2001 | Al-Nabulsi | 219/85.22 |
| 6,337,456 B1 | 1/2002 | Taniguchi et al. | |

FOREIGN PATENT DOCUMENTS

| | | | |
|---|---|---|---|
| DE | 201 07 328 U1 | 8/2001 | |
| EP | 0 715 925 A | 6/1996 | |
| EP | 1 010 491 A | 6/2000 | |
| GB | 1385427 A | 2/1975 | |
| SU | 892458 A | 12/1981 | |
| SU | 1055608 A | 11/1983 | |
| SU | 1349926 A1 | 11/1987 | |
| SU | 1673344 A2 | 8/1991 | |
| SU | 1722743 A1 | 3/1992 | |

OTHER PUBLICATIONS

International Search Report.
Translation of pertinent pages of Opposition filed by Festo AG & Co. against DE 10 2004 063 463.

* cited by examiner

METHOD AND APPARATUS FOR CONTROLLING ELECTRODE ARMS OF A WELDING DEVICE

CROSS REFERENCE TO RELATED APPLICATIONS

Applicants claim priority under 35 U.S.C. §119 of German Application No. 10 2004 063 463.7 filed Dec. 23, 2004. Applicants also claim priority under 35 U.S.C. §365 of PCT/DE2005/002161 filed Nov. 30, 2005. The international application under PCT article 21(2) was not published in English.

PRIOR ART

The present invention relates to a method for controlling a compensation cylinder unit for adjustment of a weight compensation for electrode arms of a welding device according to the preamble of claim 1 and to a compensation cylinder unit as drive for electrode arms of a welding device according to the preamble of claim 7.

Such compensation cylinder units are employed, for example, in connection with fluidic electrode holders of the kind known from DE 201 07 328 U1. Further applications of such compensation cylinder units include riveting devices, ultrasound welding devices and, quite generally, automatic manipulator units where two arms perform a movement similar to that of a tong.

EP 0 715 925 A1 discloses a piston-and-cylinder assembly serving as a drive for electrodes of a welding device.

In the case of pneumatic electrode holders, one arm of the electrode holder is held in the balance by a cylinder through a variable pressure ratio.

Now, it is a problem that a defined pressure ratio needs to be adjusted and stored for every weight force depending on the particular spatial position.

In that respect, the arrangement may be such that the pressure in the chamber of a piston-and-cylinder assembly is adjusted by a manually operated pressure regulator on the one side of the piston while a pressure-regulating proportional valve is employed on the opposite side of the piston for overdriving or under-driving.

Alternatively, the two pressure chambers of the compensation cylinder unit may each be driven by one proportional valve in order to achieve the required pressure ratio and, thus, forces acting in two directions. Finally, one could also imagine the use of sets of springs to allow for the different weight forces.

It is a problem of those arrangements that they do not work satisfactorily in practice and that, in particular, they are susceptible to impairment by dirt, variations in frictional conditions and temperature influences.

Now, it is the object of the present invention to provide a method of the before-mentioned kind for controlling a compensation cylinder unit for electrodes of a welding device, that can be driven to perform a movement similar to that of a tong, which allows the welding device to be driven precisely in different spatial positions, independently of the weight forces acting on the electrodes in those spatial positions.

Further, it is an object of the present invention to provide a compensation cylinder unit for electrodes of a welding device, that can be driven to perform a movement similar to that of a tong, which is insensitive to external influences such as wear, friction, temperature changes, and which allows easy and precise adjustment of its differential pressure so that the different weight forces acting on the electrodes in any welding position can be precisely compensated.

ADVANTAGES OF THE INVENTION

That object is achieved by a method for controlling a compensation cylinder unit of the described species having the features defined in claim 1.

Advantageous embodiments of the method are the subject-matter of Sub-claims 2 to 6 that are referred back to claim 1.

The basic idea of the invention is seen in the fact that adjusting the compensation of weight in different spatial positions of the electrode arms is effected by driving the compensation cylinder unit using a highly dynamic proportional valve, first in accordance with path signals and then in accordance with pressure signals.

Once the welding device has assumed a welding position, the piston assembly is initially moved into a predeterminable position in accordance with path signals, and the pressures prevailing in the pressure chambers in that position are determined and the associated pressure signals, characteristic of those pressure values, are stored in the control unit. The invention makes use in this connection of the fact that the pressure difference correlates with the force required for the desired pressure compensation. The system is then switched over from position control to pressure control, while the pressures prevailing in the two pressure chambers are kept constant by continuously determining the pressure signals representative of the pressures prevailing at any time in the pressure chambers, comparing the values so determined with the pressure signals stored, and driving the proportional valve in response to that comparison so that the difference between the pressures prevailing in the two pressure chambers, especially during operation of the welding-pressure cylinder unit—also described as welding-pressure cylinder—is kept constant. An upper electrode arm of the welding device is displaced in this way by the clamping cylinder until it comes into contact with the sheet to be welded. Any further operation of the welding cylinder then exerts a pressure on the compensation cylinder unit. The pressure difference in that position is kept constant by the compensation cylinder unit with the effect that weight compensation is maintained until the second electrode as well comes into contact with the sheet to be welded, by continued operation of the welding-pressure cylinder unit, so that the welding operation can be started.

Advantageously, the pressure prevailing in the two pressure chambers is determined by pressure sensors which, according to an advantageous configuration, may even be part of the proportional valve as such. Alternatively, it may also be envisaged to determine the difference between the pressures prevailing in the two pressure chambers by at least one differential pressure sensor. In that case, only a single signal has to be determined and processed.

Instead of sensing the pressure using pressure sensors, for determining the resulting force, there is also the possibility to arrange one or more force sensors, for example a force transducer, on the piston-and-cylinder assembly.

The object of the invention is further achieved by a compensation cylinder unit for electrode arms of a welding device having the features of claim 7. Advantageous further developments of the compensation cylinder unit are the subject-matter of claim 7, which is referred back to Sub-Claims 8 to 12.

The use of a highly dynamic proportional valve, which is driven by a control unit first in response to a path signal representative of the position of the piston assembly of the compensation cylinder unit and then in response to two pressure signals representative of the pressures prevailing at any time in the pressure chambers of the compensation cylinder unit, permits precise and especially rapid compensation of the weight force to be achieved.

Preferably, the proportional valve comprises an electronic control unit, in particular at least one microprocessor, for performing the control in response to both path and pressure.

Instead of a microprocessor, other circuit components may also be provided. Especially, a control circuit of an analog kind, or the like, may in principle be provided as well.

DRAWING

Further advantages and features of the invention will be described hereafter and are illustrated in the drawing which shows one embodiment of the invention. In the drawing.

DESCRIPTION OF THE EMBODIMENTS

Figure 1:
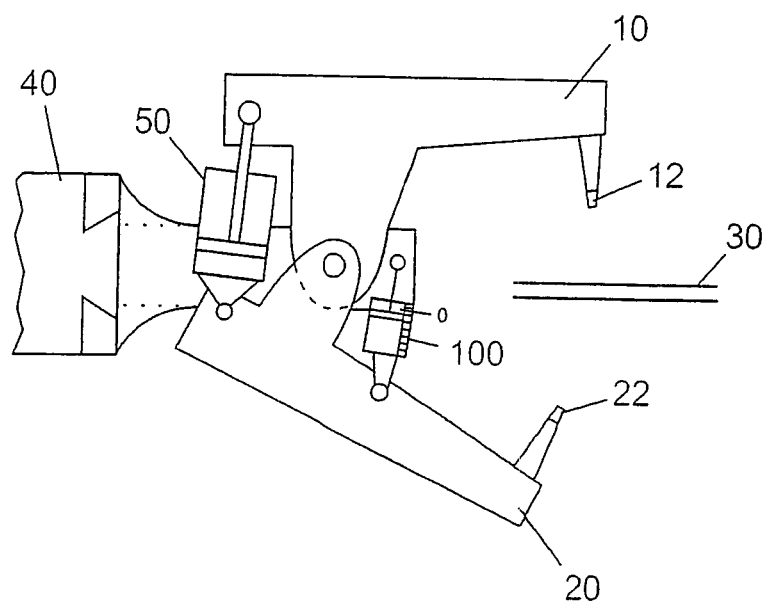
FIG. 1 shows a diagrammatic representation of a welding device comprising a compensation cylinder unit according to the invention for compensation of the weight of the electrode arms of the welding device.

A welding device, also known as electrode holder, as represented in FIG. 1 comprises two arms 10, 20 on which electrodes 12, 22 are provided for welding sheets 30. The electrode holder is arranged on a robot arm 40, for example.

The electrode holder is actuated by a welding-pressure cylinder unit 50. Precise adjustment of the arms 10, 20 is effected by a piston-and-cylinder assembly described as compensation cylinder unit 100.

Figure 2:
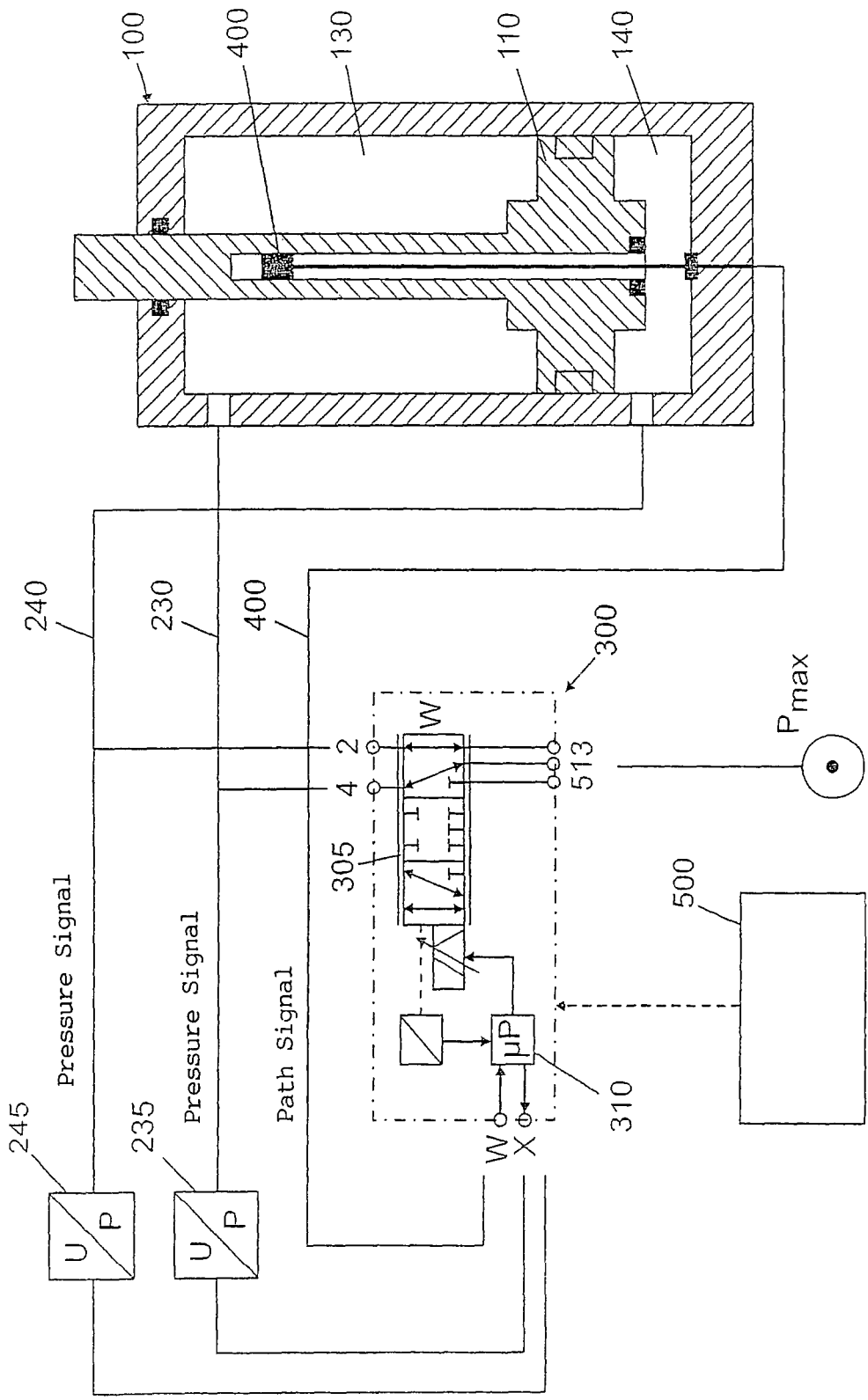
FIG. 2 shows a diagrammatic representation of a compensation cylinder unit of the welding device illustrated in FIG. 1, using the invention.

The compensation cylinder unit 100 is illustrated diagrammatically in FIG. 2. It comprises a double-acting cylinder unit having a cylinder 100 and two pressure chambers 130, 140 that are subdivided by a piston assembly 110. Both pressure chambers 130, 140 can be supplied with a pressurized fluidic medium (pressure fluid) via pressure lines 230, 240. The pressure in the two pressure chambers 130, 140 is sensed by pressure sensors 235, 245 that may be integrated in the piston-and-cylinder assembly.

The pressure signals emitted by the pressure sensors 235, 245 are supplied to a control unit, for example a microprocessor 310, that is part of a proportional valve unit indicated by reference numeral 300.

The proportional valve unit 300 may comprise a highly dynamic proportional 5/3-way valve 305, for example, which in one position (the illustrated position) supplies to the pressure chamber 130, via line 230, a pressure $P_{max}$ present at inlet 1—according to the conventional identification system—of the proportional valve unit 300 which latter comprises further inlets 5, 3 and outlets 4, 2. The outlets are connected to pressure lines 230, 240. The pressure chamber 130 is ventilated, the pressure chamber 140 is deaerated in this case.

In another position of the valve, the pressure fluid is applied to the pressure chamber 140, while the pressure chamber 130 is deaerated in that position.

In addition to the two pressure signals, the microprocessor 310 of the proportional valve unit 300 is further supplied with a path signal from the position sensor 400 of a position sensor system 410 in response to which the 5/3-way valve 305 can be driven as well. The microprocessor 310 as such is supplied with control signals from a higher-level control 500.

Figure 3A:
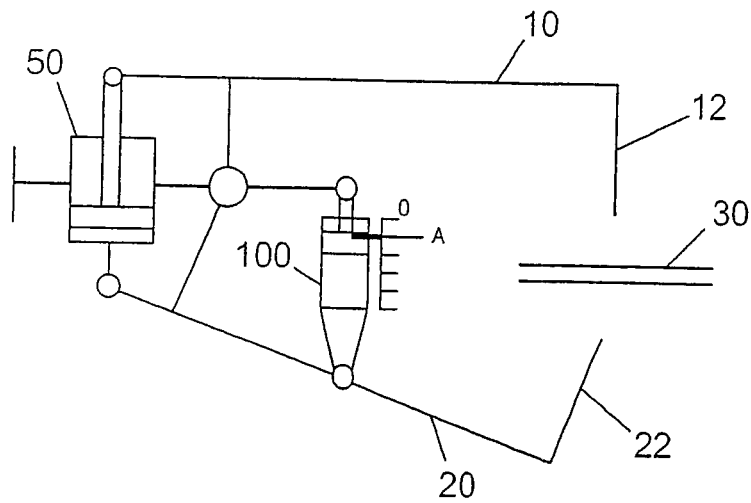
FIGS. 3a-3c show diagrammatic representations of different operating positions of the welding device illustrated in FIG. 1, illustrating the operation of the compensation cylinder unit according to FIG. 2.

A method for controlling the compensation cylinder unit 100 for compensation of the weight of the electrode arms 10, 20 of the welding device will now be described with reference to FIGS. 3a to 3c.

Once the device has been displaced to the desired welding position by the robot arm 40, the microprocessor 310 initially adjusts the piston unit 110 from its zero position to a (small) setpoint value A using the 5/3-way valve 305. This is achieved by controlling the position of the piston unit 110 in accordance with the path signal supplied by the position sensor 400.

The associated force, resulting from the pressures in the two pressure chambers 130, 140, is determined in that position of the piston unit 110 by the two pressure sensors 235, 245, or else by a differential pressure sensor known as such and not shown in detail, and is maintained by the microprocessor 310 in a force-controlled way, by automatic control of the 5/3-way valve 305. The pressure difference between the pressures prevailing in the two valve chambers 130, 140 so determined, corresponding to the force necessary for the desired weight compensation, is stored. The predeterminable position setpoint A of the piston unit 110 is selected so that it will be located at a predeterminable position, for example a few millimeters above the stop of the piston assembly 110, in order to allow the pressure to be regulated, which would not be possible in contact with the stop of the piston unit 110.

Thereafter, position control is switched off, and only the pressure difference is kept constant by the microprocessor 310 by suitably controlling the proportional 5/3-way valve 305 in the manner described above. Especially, the force acting on the arm 20 is kept constant independently of the spatial position of the arm 20.

Figure 3B:
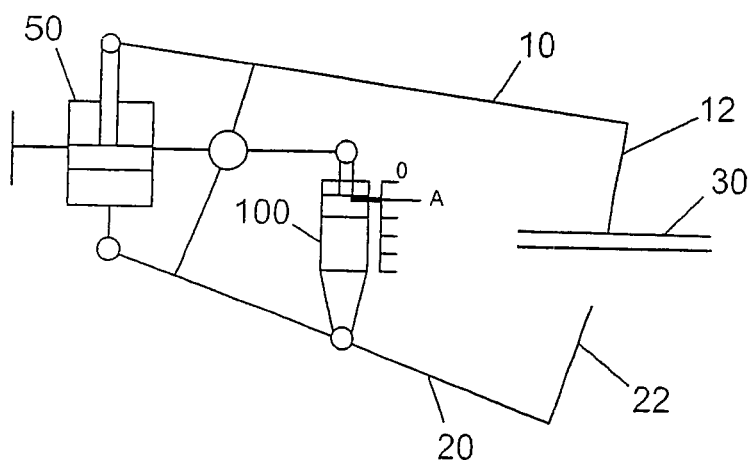

In a next step, illustrated in FIG. 3b, the upper arm 10 of the electrode holder is displaced by the welding-pressure cylinder unit 50 so that the electrode 12 comes to contact the sheet 30. The resulting force, produced by the compensation cylinder unit 100, is kept constant by continuously controlling the proportional valve 305 in this case as well.

Figure 3C:
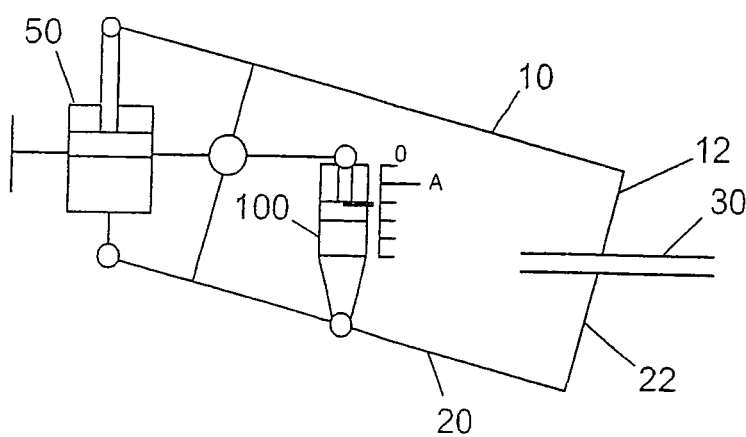

In a last step, illustrated in FIG. 3c, the lower floating arm 20 is "pulled tight" by another actuation of the welding-pressure cylinder unit 50 and the resulting increase in force of the compensation cylinder unit 100. During that movement, any variation in pressure in the two pressure chambers 130, 140 is sensed by the pressure sensors 235, 245. When the pressure on one side of the compensation cylinder unit 100 changes as a result of a force produced when the electrodes 12, 22 come into contact with the sheet 30, the proportional valve unit 300 immediately reacts by varying the pressure using the microprocessor 310 and the highly dynamic proportional 5/3-way valve 305, by ventilating/deaerating the two pressure chambers 130, 140 until the desired and stored pressure ratio has been restored. This has the result to change the position of the piston assembly 110 in the cylinder of the compensation cylinder unit 100, which means that the volume relationship between the two pressure chambers 130, 140 changes. Weight compensation is maintained in this way.

Operation of the welding-pressure cylinder unit 50 is then continued until the second electrode 22 likewise is in contact with the sheet 30 to be welded, whereupon welding is effected.

In the above description, the means for measuring the resulting force of the piston assembly 110 is implemented as means for determining the differential pressure. It is understood that the invention is not restricted to that solution.

Instead, the force may also be measured directly, for example by means of a force transducer.

The advantage of the method described above is seen in the fact that the arm 20 is held in a "floating" condition and is sort of "pulled tight" by the piston-and-cylinder assembly 100 almost without any application of force and only at the time of closing of the electrode holder, i.e. at the moment the electrode 22 gets into contact with the sheet 30 to be welded. It is an essential advantage that compensation is achieved in this way automatically and especially without any TEACH-IN processes, for any welding point and in any spatial position. If the spatial position of the electrode holder and, accordingly, the weight relationships do not change, then the adjusted pressure ratio can be stored and be used for further welding points.

Further, it is an essential advantage that any external influences, such as wear, friction, temperature variation or burn-loss of the electrodes 12, 22, are compensated automatically by the described pressure regulation.

The invention has been described above with reference to a welding device. However, it is understood that the invention, instead of being restricted to a compensation cylinder unit for a welding device, can be used also in connection with other devices, such as riveting devices, US welding devices, automatic manipulator units, and the like, where two arms perform a movement similar to that of a tong.

The invention claimed is:

1. A Method for controlling weight compensation for electrode arms (10, 20) of a welding device, comprising the steps of:
    providing at least one welding-pressure cylinder unit (50) having a first piston rod, wherein the at least one welding-pressure cylinder unit (50) is attached to the first electrode arm (10) and the second electrode arm (20);
    actuating the at least one welding-pressure cylinder unit (50) to displace the first and second electrode arms (10, 20) to a desired position;
    providing at least one double-acting compensation cylinder unit (100) having a second piston rod, wherein the at least one double-acting compensation cylinder unit (100) is attached to at least one of the first electrode arm (10) and the second electrode arm (20), wherein the at least one double-acting compensation cylinder unit (100) comprises a piston assembly (110) and at least two pressure chambers (130, 140), subdivided by the piston assembly (110), and a proportional valve unit (300) for applying a pressure medium to the pressure chambers (130, 140) wherein the proportional valve unit (300) comprises a proportional valve (305) and a control means (310) for controlling the proportional valve (305) in response to a path signal representative of the position of the piston assembly (110) and/or in response to two pressure signals representative of the pressure prevailing at any time in the pressure chambers (130, 140);
    driving the proportional valve (305) in an operating position of the welding device in response to the path signal so that the piston assembly (110) is displaced to a predeterminable position;
    determining the pressures resulting in that position in the pressure chambers (130, 140) and storing the associated pressure signals in the control means (310); and
    determining the pressure signals representative of the respective pressures in the pressure chambers (130, 140), comparing them with the stored pressure signals and driving the proportional valve (305) in response to that comparison so that the force of the piston assembly (110) resulting from the pressures prevailing in the two pressure chambers (130, 140) is kept constant when the welding-pressure cylinder unit (50) is operated.

2. The method as defined in claim 1, wherein the pressure in the two pressure chambers (130, 140) is sensed by pressure sensors (235, 245).

3. The method as defined in claim 2, wherein the pressure sensors (235, 245) are part of the proportional valve (305).

4. The method as defined in claim 1, wherein the difference between the pressures in the two pressure chambers (130, 140) is sensed by at least one differential pressure sensor.

5. A device for controlling pressure compensation for electrode arms (10, 20) of a welding device, comprising:
    a welding-pressure cylinder unit (50) having a first piston rod, wherein the welding-pressure cylinder unit (50) is coupled to both of the electrode arms (10, 20);
    a compensation cylinder unit (100) having a second piston rod, wherein the compensation cylinder unit (100) acts as a drive for at least one of the electrode arms (10, 20), wherein the compensation cylinder unit (100) has at least two pressure chambers (130, 140), subdivided by a piston assembly (110); and
    a proportional valve unit (300) for optionally applying a pressure medium to the pressure chambers (130, 140), wherein the proportional valve unit (300) comprises a proportional valve (305) and a control means (310) for controlling the proportional valve (305) first in response to harmonized path signals that represent the position of the piston assembly (110), and then in response to pressure signals representative of the pressure prevailing at any time in the pressure chambers (130, 140) so that the difference between the pressures that prevail in the pressure chambers (130, 140) in a predeterminable position of the piston assembly (110) assumes a constant value that represents the weight compensation force of at least one electrode arm (20) as the welding-pressure cylinder unit (50) is actuated.

6. The device as defined in claim 5, wherein pressure sensors are provided for sensing the pressure in the two pressure chambers (130, 140).

7. The device as defined in claim 6, wherein the pressure sensors are part of the proportional valve (305).

8. The device as defined in claim 5, comprising a differential pressure sensor provided for determining the difference between the pressures in the two pressure chambers (130, 140).

9. The device as defined in claim 5, wherein the control is realized by one or more of the following components: Microprocessor, control circuit built up from analog circuit elements.

10. The device as defined in claim 5, wherein the control means (310) and the proportional valve (305) are arranged in a single component.

11. A method for controlling weight compensation for electrode arms (10, 20) of a welding device comprising the steps of:
    driving a proportional valve (305) of a proportional valve unit (300) in an operating position of the welding device by applying a pressure medium to pressure chambers (130, 140) in response to a path signal so that a piston assembly (110) of a double-acting compensation cylinder unit (100) having a first piston rod is displaced to a predeterminable position, wherein the double-acting compensation cylinder unit (100) is attached to at least one of the first electrode arm (10) and the second electrode arm (20), wherein the proportional valve unit (300) comprises a proportional valve (305) and a control means (310) for controlling the proportional valve (305)

in response to the path signal, wherein the path signal is representative of at least one of the position of the piston assembly (110) and pressure signals representative of pressures prevailing at any time in the pressure chambers (130, 140), wherein the pressure chambers (130, 140) are subdivided by the piston assembly (110);

determining the pressures resulting from the operating position in the pressure chambers (130, 140) and storing the associated pressure signals in the control means (310);

driving a welding-pressure cylinder unit (50) having a second piston rod to actuate the electrode arms, wherein the welding-pressure cylinder unit (50) is attached to the first electrode arm (10) and the second electrode arm (20);

determining the pressure signals representative of the respective pressures in the pressure chambers (130, 140);

comparing the pressure signals representative of the respective pressures in the pressure chambers (130, 140) with the stored pressure signals;

driving the proportional valve (305) in response to the comparison so that the force of the piston assembly (110) resulting from the pressures prevailing in the two pressure chambers (130, 140) is kept constant when the welding-pressure cylinder unit (50) is driven; and actuating electrode arms (10, 20) with the welding-pressure cylinder unit (50).

12. The method as defined in claim 11, wherein the pressure in the two pressure chambers (130, 140) is sensed by pressure sensors (235, 245).

13. The method as defined in claim 12, wherein the pressure sensors (235, 245) are part of the proportional valve (305).

14. The method as defined in claim 11, wherein the difference between the pressures in the two pressure chambers (130, 140) is sensed by at least one differential pressure sensor.

* * * * *